W. G. CRONKRIGHT.
AUXILIARY POWER PLANT.
APPLICATION FILED JULY 9, 1917.
1,305,068.
Patented May 27, 1919.
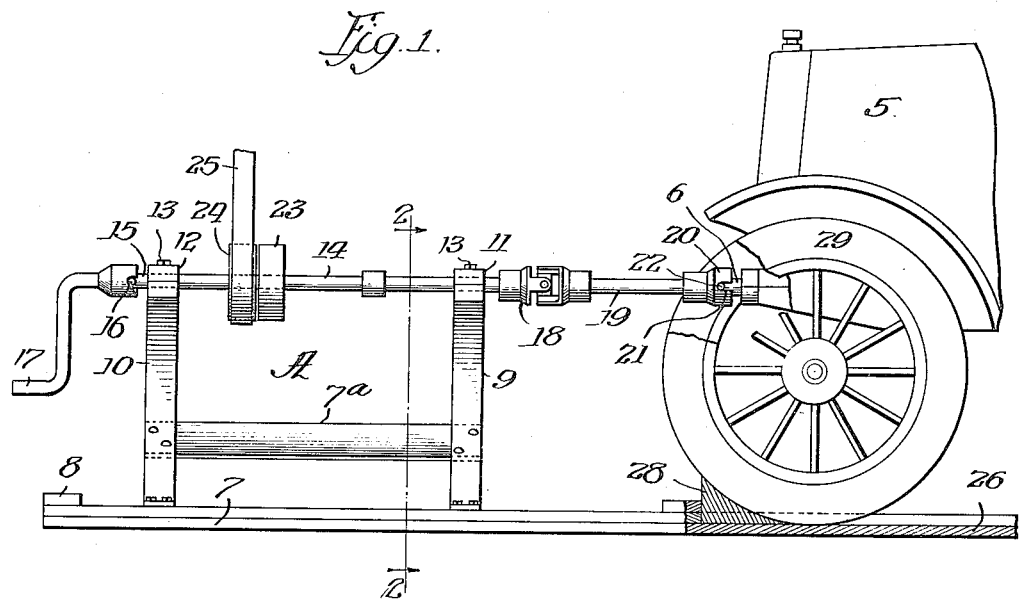
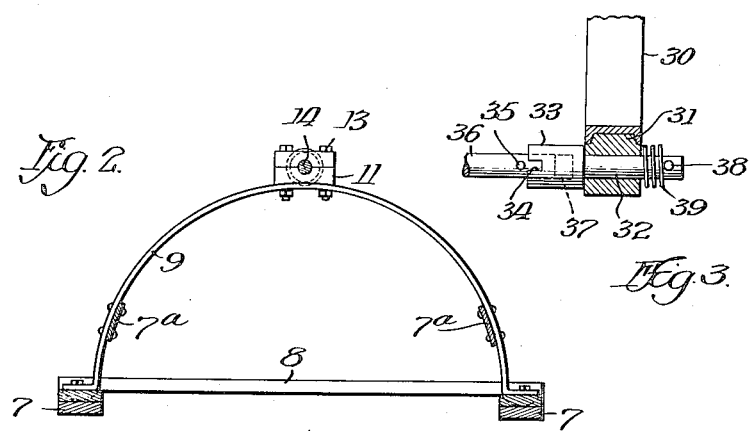
Witnesses:
Inventor
Wesley G. Cronkright,
By Wilkinson & Huxley
Attys.

UNITED STATES PATENT OFFICE.

WESLEY G. CRONKRIGHT, OF CHICAGO, ILLINOIS, ASSIGNOR OF ONE-HALF TO ANDREW J. HUNSAKER, OF CHICAGO, ILLINOIS.

AUXILIARY POWER PLANT.

1,305,068.　　　　　Specification of Letters Patent.　　Patented May 27, 1919.

Application filed July 9, 1917. Serial No. 179,299.

*To all whom it may concern:*

Be it known that I, WESLEY G. CRONKRIGHT, a citizen of the United States, residing at Chicago, in the county of Cook and State of Illinois, have invented certain new and useful Improvements in Auxiliary Power Plants, of which the following is a specification.

My invention has to do with power transmission means and particularly to a novel auxiliary power transmitting means which is adapted for connection to an automobile engine as a source of power.

Often times it is desirable to utilize engines of automobiles and the like for commercial purposes in connection with certain kinds of work especially in rural communities, such as operating grinding and feeding mills, ensilage cutters and the like.

One of the objects of my invention is to provide a power transmitting means which may be connected with the front end of the crank shaft of the automobile engine.

Another object is to provide an auxiliary power plant for coöperation with an automobile engine and means for alining the auxiliary plant with the automobile, said means including an extension of the base of the auxiliary plant.

A further object is to provide an auxiliary power plant for coöperation with an automobile engine, the plant having a portion for engagement by the automobile wheels when in operative position.

These and other objects will be apparent from the drawings, wherein:—

Figure 1 is a side elevation of the preferred embodiment of my invention as applied to the front end of an automobile.

Fig. 2 is a section on line 2—2 of Fig. 1, and

Fig. 3 is an elevation of one form of adapter.

5 represents the front end of an automobile having the front end 6 of the crank shaft projecting therefrom as is common practice. The power plant represented by A comprises a frame consisting of longitudinally extending members 7 and cross members 8 fastened in any desirable manner and forming a base portion. Mounted on the members 7 are upwardly extending side frame members 9, 10, in the form shown being preferably semi-circular and connected if necessary by cross bars 7ª. Carried by the members 9, 10, are bushings 11, 12, the top portions of which are secured to the lower by bolts 13. A shaft 14 is mounted in the bushings 11, 12, and is adapted to extend beyond the members 9, 10, of the frame A one end 15 being provided with a pin 16 for engagement by handle 17, the purpose of which will be explained later, the other end of the shaft 14 being provided with a member for connection to an automobile engine and comprising, in the form shown, a universal joint 18 and an auxiliary shaft 19, the shaft 19 having a hooded end 20 provided with a recess 21 for coöperation with the end of the crank shaft 6 of the engine which usually is provided with a pin 22 for engagement by the crank handle for starting purposes. Between the members 9, 10, of the frame I provide pulleys 23, 24, one of which may be a loose pulley if desired. A belt 25 is arranged to run over pulleys 23, 24, for transmission of the power to any suitable machine. I prefer to make the power plant a collapsible one so that it may be taken apart quickly and easily transported and assembled. To accomplish this the frame members 9, 10, are fastened to the base portion 7 in any suitable manner such as by bolts and the transverse members 7ª of the frame are also bolted to the members 9, 10. For alining the auxiliary member A with the crank shaft 6 of the automobile 5 I provide extensions 26 of the base portions against which the wheels 29 rest and are guided into operative position with the shaft 14. It will be apparent that by the proper arrangement of the base members 7 and the extensions 26 and the side members 9, 10, of the frame A, the shaft 14, auxiliary shaft 19 and crank shaft 6 may be brought into alinement and maintained in such relation so that when the automobile engine is operated the crank shaft 6 will be rotated and will transmit power to the shaft 14 and through the pulleys 23, 24, and belt 25 to whatever machine is connected therewith. The provision of the universal joint 18 is for the purpose of relieving the engine of all strain or side pull and thus delivering to the shaft 14 the maximum output of the automobile engine. Once set up and adjusted the plant will be adapted for use without further adjustment. The frame A is made of light construction so that it may be easily moved from place to place permitting setting up wherever the work to be done is. There is nothing about the automobile which runs except the engine and no bad results obtain because the engine is worked against the load connected through the belt 25, pulleys 23, 24, and shaft 14. Provision of the auxiliary members 26 assures alinement at all times of the crank shaft 6 with the shaft 14, hence, makes the whole apparatus practically fool proof.

The operation of the device is as follows:

Frame A being situated at any place convenient for the work to be done the automobile 5 is then run onto the extension 26 of the auxiliary frame until the wheels 29 abut the stops 28, suitable provision (not shown) being made for blocking the automobile against the stops 28 if desired. Connection is then made between the crank shaft 6 and the hooded end 20 of the auxiliary shaft 19. It will be apparent that means must be provided for starting the engine. To this end crank handle 17 is mounted on the outward end 15 of the shaft 14 is provided so that when the shaft 14 is connected to the crank shaft 6 proper rotation of the crank handle 17 will start the automobile engine, it being understood, of course, that the belt 25 is then on the loose pulley. When the engine is started the belt may be shifted in any suitable manner to the tight pulley and the machine connected therewith caused to operate and the crank handle 17 being removed or arranged to remain at rest.

It has been found necessary in attaching the auxiliary power plant of my invention to certain makes of automobiles that an adapter of some sort is required to connect the crank shaft with the auxiliary shaft 19 as the outer end of the crank shaft does not project outwardly of the front end of the automobile. In Fig. 3 I have shown one form of such adapter. 30 is the radiator of an automobile carrying therebelow a bearing 31 within which the adapter 32 is slidably mounted. The inner end is provided with an enlarged hood member 33 having shoulders 34 for engagement with the pin 35 on the crank shaft 36. The hood 33 is provided with an inner recessed portion 37 to receive the end of the shaft 36 when the shoulders 34 are in engagement with the pins 35. The outer end of the adapter is provided with a pin 38, which is for engagement by the hood 20. Between the outer face of the bearing 31 and the pin 38 a spring is interposed to normally hold the adapter out of engagement with the crank shaft 36. For turning over the crank shaft by means of the adapter the crank is applied to the outer end of the adapter and the whole apparatus forced inwardly until the recess 34 engages the pin 35. In like manner when the auxiliary power plant —A— is connected thereto the automobile will be moved onto the guides 26 a sufficient distance so that the hooded end 20 will push the adapter inwardly to engage the pin 35 on the shaft 36 and will then be turned thereby as the engine is run.

I do not limit my invention to the exact form shown and described but consider such modifications as may be made in a device of this kind as coming within the scope of my invention.

I claim:

1. A portable power plant, in combination, a pulley carrying shaft, means for supporting said shaft above the ground, means for operatively connecting said shaft to the crank shaft of the motor of a motor vehicle, said supporting means having guides attached thereto and forming an extension of the bottom thereof for alining said vehicle and shaft supporting means for operative connection therebetween, said shaft having a free end thereof provided with a detachable handle.

2. A portable power transmitting unit comprising, in combination, a shaft adapted for connection to the crank shaft of the motor of a motor vehicle, means for supporting said shaft in operative relation thereto, and means associated with said first means to direct the vehicle into position for operative connection with said shaft, whereby the weight of said vehicle serves as a means for preventing relative movement therebetween.

3. A device for utilizing the power of motor vehicles for industrial use in combination, portable means for supporting a power shaft, guideways connected with said means for receiving the wheels of the vehicle whereby to direct and maintain said vehicle in operative relation with respect to said shaft whereby the weight of said vehicle serves as a means for preventing relative movement therebetween, means carried by the shaft for connection to the vehicle motor and a handle associated with the shaft for starting said motor for connection therewith the shaft.

4. A portable unit including, in combination, a base, supports carried thereby, a shaft rotatably mounted in said supports and provided with power transmission means, said base having an extension adapted to receive the front wheels of a motor vehicle and guide the vehicle into position for operative engagement with said shaft, and a member secured to said shaft for connection to the crank shaft of said motor.

5. A portable power unit, in combination, a base having uprights secured thereto, a shaft rotatably mounted in said uprights, pulleys on said shaft, said base having members extending therefrom to receive and guide the front wheels of a motor vehicle into position for operative connection of the vehicle with said shaft, and a member adapted to engage the crank shaft of the engine of said vehicle and have universal connection with the shaft supported by said base.

6. A portable power unit, in combination, a base having uprights secured thereto, a shaft rotatably mounted in said uprights, pulleys on said shaft, said base having members extending therefrom to receive and guide the front wheels of a motor vehicle into position for operative connection with said shaft, and a member adapted to engage the crank shaft of the engine of said vehicle and have universal connection with the shaft supported by said base, and said shaft having means to crank said engine when connected to said shaft.

7. In a device of the class described, in combination a base, a standard arising therefrom, and a shaft supported by said standard, said base having a portion extending beyond said standard to receive the front wheels of a motor vehicle, means to position said wheels thereon, a member adapted for connection to said shaft out of alinement therewith, and having an end portion to engage the crank shaft of the engine of said vehicle.

Signed at Chicago, State of Illinois, this 3rd day of July A. D., 1917.

WESLEY G. CRONKRIGHT.